United States Patent Office 3,080,305
Patented Mar. 5, 1963

3,080,305
MANUFACTURE OF CYCLOPENTADIENYL
METAL HALIDES
Richard D. Gorsich, Baton Rouge, La., assignor to Ethyl
Corporation, New York, N.Y., a corporation of Virginia
No Drawing. Filed July 31, 1958, Ser. No. 752,204
5 Claims. (Cl. 204—158)

This invention relates generally to cyclopentadienyl metal halides and more particularly a process for the manufacture of monocyclopentadienyl metal halides of metals of groups IV-B, V-B and molybdenum and containing three or four halogen groups, depending upon the metal.

The compounds manufactured by the process of this invention have only recently been discovered and represent some of the few known stable organo compounds of these metals. The compounds are useful as catalyst components for polymerization of olefins, as intermediates for the manufacture of other compounds and, due to their hydrocarbon solubility, are useful as additives to fuels such as gasoline, fuel oils, diesel fuels, and the like.

It is accordingly an object of this invention to provide a new and novel process for the manufacture of cyclopentadienyl halogen compounds of metals of groups IV-B, V-B and molybdenum. Another object is to provide an improved process which will produce the above compounds economically and in high yield. Another object is to provide a process which will provide halogenated cyclic hydrocarbons as a by-product. Other objects and advantages of the present invention will be more apparent in the following description and appended claims.

It has now been found that these and other objects of the invention can be accomplished by reacting bis(cyclopentadienyl) metal halides directly with the coresponding elemental halogens to form the desired monocyclopentadienyl metal halides, having one additional halogen atom relative to the starting material, and also halogenated cycloalkanes corresponding to the number of carbon atoms in the cyclopentadienyl group. More particularly, the process comprising reacting a bis(cyclopentadienyl) metal halide having the general formula $$Cp_2MX_n$$

wherein Cp is a cyclopentadienyl group or a substituted cyclopentadienyl group; M is a group IV-B, V-B or molybdenum metal; X is a halogen, especially chlorine, bromine and fluorine; and n is from 2 to 3 inclusive. The process is generally carried out at a temperature of from about −50° to about 300° C., preferably 20° to 150° C. The process can be conducted in the absence of a solvent but when no solvent is employed, it is preferred to employ conditions wherein the halogen is in a liquid state. However, solvents are frequently desirable at the more elevated temperature conditions. The process can be carried out in the absence or in the presence of a catalyst.

The process of this invention for manufacture of the cyclopentadienyl metal halides is particularly simple, economical and useful for commercial production of these compounds. It is particularly surprising, however, that bis(cyclopentadienyl) metal compounds of this type can be halogenated directly with the elemental halogen since it is known that halogens do tend to effect complete cleavage of the cyclopentadienyl groups from the metal, even with such extremely stable compounds as ferrocene [bis(cyclopentadienyl) iron]. Of special significance is the fact that it is possible to obtain selective cleavage on only one of the cyclopentadiene groups. It is particularly surprising that, in contrast to other reactions of bis-cyclopentadienyl metal compounds, the cyclopentadiene group which is displaced from the metal does not polymerize but instead is halogenated to a saturated cyclic hydrocarbon.

Typical examples of compounds which may be made in accordance with the present invention are cyclopentadienyl titanuim trichloride, cyclopentadienyl titanium trichloride, cyclopentadienyl titanium tribromide, and corresponding metal halide compounds containing ethylcyclopentadienyl-, butylcyclopentadienyl-, octylcyclopentadienyl-, dimethylcyclopentadienyl-, dihexylcyclopentadienyl-, vinylcyclopentadienyl-, ethynylcyclopentadienyl-, phenylcyclopentadienyl-, methylphenylcyclopentadienyl-, acetylcyclopentadienyl-, allylcyclopentadienyl-, benzylcyclopentadienyl-, tolylcyclopentadienyl- and other like radicals.

Other cyclopentadienyl metal halide compounds which can be made by the process of this invention are cyclopentadienyl zirconium trichloride, methylcyclopentadienyl zirconium tribromide, cyclopentadienyl hafnium trichloride, phenyl cyclopentadienyl hafnium trifluoride, cyclopentadienyl vanadium trichloride, methylcyclopentadienyl vanadium tribromide, cyclopentadienyl niobium tetrachloride, methylcyclopentadienyl niobium tetrabromide, cyclopentadienyl tantalum tetrachloride, methylcyclopentadienyl tantalum tetrachloride, octylcyclopentadienyl tantalum tetrabromide, phenylcyclopentadienyl tantalum tetrachloride, cyclopentadientyl molybdenum tetrachloride, methylcyclopentadienyl molybdenum tetrachloride, octylcyclopentadienyl molybdenum tetrabromide and the like.

Compounds containing mixed halogens can also be made by the process of this invention. Thus, bis(cyclopentadienyl) metal halides of any of the above-mentioned halides can be reacted with different elemental halogens to form mixed monocyclopentadienyl metal halides containing three or four halogen atoms. Generally, bis-(cyclopentadienyl) metal dihalides or trihalides can be reacted with an elemental halogen to form monocyclopentadienyl metal compounds containing two different halogens. Typical examples of these compounds are cyclopentadienyl titanium dichloride bromide, cyclopentadienyl titanium chloride dibromide, cyclopentadienyl titanium dichloride fluoride, cyclopentadienyl titanium bromide difluoride, cyclopentadienyl molybdenum trichloride bromide and the like.

In general, the preferred compounds of this invention have three halogens in all compounds containing titanium, zirconium, hafnium and vanadium, whereas the compounds have four halogens in compounds containing one of the metals niobium, tantalum and molybdenum.

In the preferred compounds of the present invention the cyclopentadienyl moiety contains from 5 to 15 carbon atoms and includes not only alkyl and aryl substituted cyclopentadienyl groups but also includes indenyl and fluorenyl derivatives, including substituted indenyl and fluorenyl derivatives.

As pointed out above, the reaction of this invention can be conducted at temperatures ranging from about −50° to about 300° C., and is preferably conducted at temperatures of about 20° to 150° C. Lower temperatures can be employed except that the reaction rate is normally quite slow and the cost is increased due to refrigeration requirements. The upper temperature limit is normally controlled by the degree of decomposition of the reactants or product, but with some of the compounds of this invention can be conducted, if desired, at temperatures even above 300° C. In general, the reaction rate increases at the more elevated temperatures. Moreover, at the elevated temperatures, the yield of the cyclic hydrocarbon by-product is materially increased, best results being obtained from the standpoint of by-product production at temperatures above about 50° C.

The process of this invention can be conducted at subatmospheric to superatmospheric pressures. Normally, it is preferred to conduct the process at atmospheric or near atmospheric pressures. However, pressures of the order of 0 to 1000 p.s.i. halogen pressure can be employed.

When solvents are employed, it is best to use a medium which is inert to halogenation or which, upon halogenation, results in a liquid product. Very satisfactory reaction conditions are obtained in using halogenated hydrocarbons, and preferably highly halogenated hydrocarbons, such as the perhalogen aliphatic compounds or the higher chlorinated aromatic compounds. Typical examples of suitable solvents are the carbon tetrachloride, chloroform, dichloroethanes, trichloroethanes, trichloroethylene, tetrachloroethylene, trichlorobenzenes, tetrachlorobenzenes, hexachlorobenzene, chlorinated toluenes and xylenes, chlorinated biphenyl, chlorinated naphthalene and corresponding bromine and fluorine derivatives. In addition to the hydrocarbon solvents, halogenated ethers, such as chlorinated aliphatic ethers, containing one to ten carbon atoms, halogenated ethylene glycol ethers, including polyethers such as halogenated diethylene glycol diethyl ethers and the like.

The reaction rate of the process can be increased by the use of catalysts in the reaction. Ultraviolet light is a particularly useful catalyst for this purpose as well as peroxides, particularly the organic peroxides, such as lauroyl peroxide, benzoyl peroxide, t-butyl hydroperoxide, di-isopropylbenzene monohydroperoxide, acetyl peroxide, di-t-butyl peroxide, acetyl benzoyl peroxide, succinyl peroxide, peracetic acid, m-bromobenzoyl peroxide, persuccinic acid, urea peroxide, dialkyl peroxy dicarbonate, ascaridole, and cyclohexanone peroxide.

The quantity of solvent employed in the process is not critical except that it is usually best to employ a sufficient amount to prevent premature crystallization of the product, particularly when carrying out the process in a continuous fashion, or when it is desired to discharge the reaction to suitable purification and recovery equipment. In general, it is suitable to employ from about one mole equivalent to about 100 mole equivalents of solvent.

In carrying out the process of this invention, it is further desirable to separate the product from the excess elemental halogen prior to an unduly long contact period since there is some tendency for the halogen to further cleave the remaining cyclopentadienyl group of the product. This is much less prevalent with bromine than it is with chlorine.

The following are typical examples which illustrate the process of the present invention.

*Example I*

To a reactor equipped with a gaseous halogen inlet tube having an exit port below the surface of the liquid reactants was added eight parts of bis(cyclopentadienyl) titanium dichloride and 300 parts of carbon tetrachloride. Chlorine gas at atmospheric pressure was passed through the mixture at a moderate rate for 2.66 hours while maintaining the reaction temperature between 55°–60° C. until the bis(cyclopentadienyl) titanium dichloride was consumed, as was evidenced by the change of color of solution from dark red to yellow. Excess chlorine was purged with nitrogen and the reaction mixture was concentrated by distillation of solvent. After cooling to room temperature, the yellow crystals were filtered off to give 5.6 parts of cyclopentadienyl titanium trichloride, melting point 185° C. (at decomposition). The remaining product was recrystallized from a mixture of methylene chloride with carbon tetrachloride. The solvent was distilled under reduced pressure from the carbon tetrachloride. The residue was dissolved in n-pentane, filtered, and filtrate was chilled by Dry Ice. White crystals were filtered off to give 2.39 parts of pentachlorocyclopentane, melting point 39°–41° C.

The cyclopentadienyl titanium trichloride product of this reaction can be used in stoichiometric quantities with triethyl aluminum to form an active catalyst for the polymerization of olefins, such as ethylene. Under normal polymerization conditions, solid polyethylene is obtained having a melting point of from about 120°–130° C.

*Example II*

When the procedure of Example I was repeated using 240 parts of carbon tetrachloride at reflux conditions, 5.4 parts of cyclopentadienyl titanium trichloride and 2.6 parts of pentachlorocyclopentane was obtained.

*Example III*

Example I was repeated except that 320 parts of carbon tetrachloride were employed as a solvent and the reaction was conducted at room temperature. In this case, chlorine was bubbled through the reaction mixture for a period of ten hours. The yield of cyclopentadienyl titanium trichloride was 4.6 parts. No pentachlorocyclopentane was isolated. Instead, an unidentified oil by-product was obtained which is believed to be a mixture of chlorinated cyclopentenes.

*Example IV*

A tubular reactor was employed constructed of glass which is transparent to ultraviolet light and to this tubular reactor was added eight parts of bis(cyclopentadienyl) titanium dichloride and 160 parts of carbon tetrachloride. A GE sunlamp was employed to irradiate the reactants with ultraviolet light. Gaseous chlorine was passed through the reaction vessel for 20 minutes. At the beginning of the chlorine addition, the reaction mixture was at room temperature and the temperature rose continuously during the chlorine addition to a final temperature of 60° C. The yield of cyclopentadienyl titanium trichloride was 3.0 parts while the yield of pentachlorocyclopentane was 7.44 parts. In addition to greatly increasing the rate of reaction to form the desired product, cyclopentadienyl titanium trichloride, the ultraviolet light also materially increased the formation of pentachlorocyclopentane.

*Example V*

Example I was repeated except that liquid bromine (30 parts) was employed instead of chlorine. In addition, ten parts of bis(cyclopentadienyl) titanium dichloride were employed. The yield of cyclopentadienyl titanium bromine dichloride (melting point 165°–170° C.) was 9.18 parts. Fractional crystallization yielded pentabromocyclopentane, melting at 102°–103° C.

*Example VI*

Example I is repeated except that bis(methylcyclopentadienyl) titanium dichloride is employed to produce the corresponding methylcyclopentadienyl titanium trichloride. This reaction is conducted in 300 parts of tetrachloroethylene at a temperature of 0° C. A good yield of product is obtained.

*Example VII*

Example I is repeated except that bis(cyclopentadienyl) zirconium dichloride is employed, using a reaction temperature of 10° C. Also, the compound is brominated by feeding liquid bromine to the reactor instead of gaseous chlorine. The reaction is conducted in 200 parts of trichlorobenzene solvent. The cyclopentadienyl zirconium bromide dichloride is obtained in good yield.

*Example VIII*

Example I is repeated except that bis(ethylcyclopentadienyl) hafnium difluoride is reacted with fluorine in 225 parts of chlorinated biphenyl at a temperature of 210° C. The ethylcyclopentadienyl hafnium trifluoride is recovered in accordance with procedure of Example I.

Example IX

Bis(cyclopentadienyl) vanadium dichloride (7 parts) is reacted at reflux in 175 parts of chloroform with gaseous chlorine to produce in good yields cyclopentadienyl vanadium trichloride.

Example X

Example I is repeated except that bis(fluorenyl) niobium trichloride is reacted with liquid bromine in carbon tetrachloride at the reflux temperature of the solvent. The product obtained in this reaction is fluorenyl niobium bromide trichloride.

Example XI

Bis(vinylcyclopentadienyl) tantalum trifluoride (12 parts) is reacted with fluorine gas (in excess) in 1,1,1-trichloroethane at the reflux temperature of the solvent. A good yield of vinylcyclopentadienyl tantalum tetrafluoride is obtained.

Example XII

Bis(indenyl) molybdenum trichloride is reacted with chlorine in accordance with the procedure of Example I in trichloroethylene under reflux conditions. The indenyl molybdenum tetrachloride is obtained in excellent yield.

The bis(cyclopentadienyl) metal halides employed as reactants in this invention may be made by conventional techniques. One suitable method is disclosed, for example, in J. Am. Chem. Soc., vol. 76, 4179 (1954).

I claim:

1. A process for producing a monocyclopentadienyl metal trihalide having the formula $$CpMX_3$$

wherein Cp is selected from a group consisting of a cyclopentadienyl hydrocarbon group and a substituted cyclopentadienyl hydrocarbon group; M is a metal selected from a group consisting of titanium, zirconium, hafnium and vanadium; X is a halide selected from the group consisting of fluorine, chlorine and bromine; from a bis(cyclopentadienyl) metal dihalide having the formula $$Cp_2MX_2$$

wherein Cp, M and X are as defined above, which process comprises reacting said dihalide with a halogen selected from the group consisting of fluorine, chlorine and bromine at a temperature of from −50° C. to 300° C. in an inert liquid organic solvent and in the presence of ultraviolet light; so as to produce said monocyclopentadienyl metal trihalide and thereafter recovering said trihalide from the reaction system.

2. The process of claim 1 wherein said bis(cyclopentadienyl) metal dihalide is bis(cyclopentadienyl) titanium dichloride and said halogen is chlorine.

3. The process of claim 1 wherein said solvent is carbon tetrachloride.

4. The process of claim 1 wherein said bis(cyclopentadienyl) metal dihalide is bis(cyclopentadienyl) titanium dichloride, said halogen is chlorine and said solvent is carbon tetrachloride.

5. A process for producing a monocyclopentadienyl metal tetrahalide having the formula $$CpMX_4$$

wherein Cp is selected from a group consisting of a cyclopentadienyl hydrocarbon group and a substituted cyclopentadienyl hydrocarbon group; M is a metal selected from a group consisting of niobium, tantalum and molybdenum; X is a halide selected from a group consisting of fluorine, chlorine and bromine; from a bis(cyclopentadienyl) metal trihalide having the formula $$Cp_2MX_3$$

wherein Cp, M and X are as defined above, which process comprises reacting said trihalide with a halogen selected from the group consisting of fluorine, chlorine and bromine at a temperature of from −50° C. to 300° C. in an inert liquid organic solvent and in the presence of ultraviolet light; so as to produce said monocyclopentadienyl metal tetrahalide and thereafter recovering said tetrahalide from the reaction system.

References Cited in the file of this patent

UNITED STATES PATENTS

| | | |
|---|---|---|
| 2,849,471 | Thomas | Aug. 26, 1958 |
| 2,911,424 | Kaufman | Nov. 3, 1959 |
| 2,914,572 | Amir | Nov. 24, 1959 |
| 2,922,802 | Kaufman | Jan. 26, 1960 |
| 2,922,805 | Kaufman | Jan. 26, 1960 |

FOREIGN PATENTS

| | | |
|---|---|---|
| 2,948,667 | Limido et al. | Aug. 9, 1960 |
| 1,160,765 | France | Mar. 10, 1958 |

OTHER REFERENCES

Nesmeyanov et al.: "Academy of Sciences of the USSR," 100, No. 6, pp. 1099–1101, 1955.